Nov. 29, 1949     F. G. FIRTH     2,489,768
DEVICE FOR ACCELERATING REACTIONS
Filed May 14, 1948
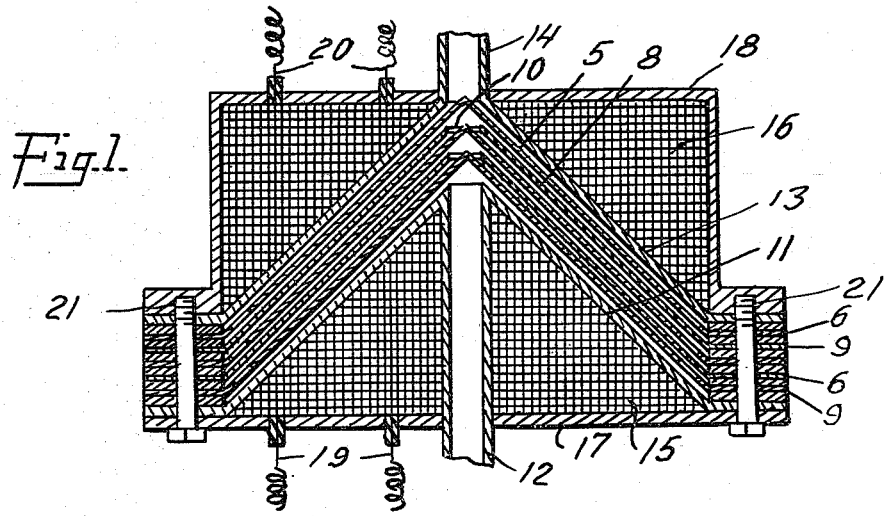
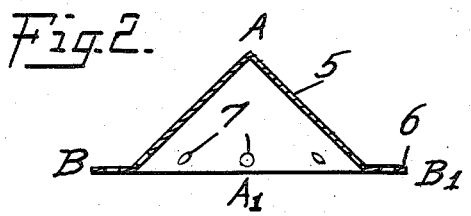
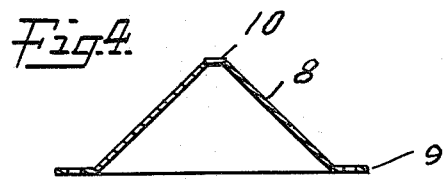
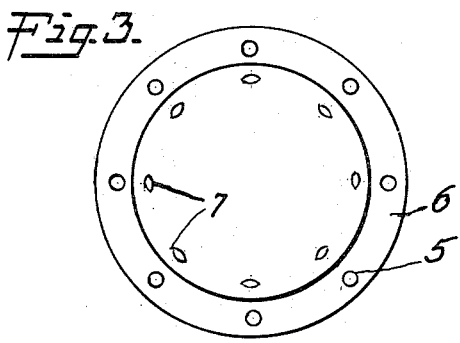
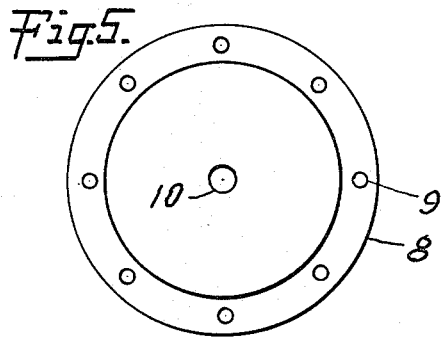
INVENTOR
Francis George Firth
BY
Pennie, Edmonds, Morton & Barrows
ATTORNEYS Patented Nov. 29, 1949

2,489,768

UNITED STATES PATENT OFFICE 2,489,768

DEVICE FOR ACCELERATING REACTIONS

Francis George Firth, New York, N. Y.

Application May 14, 1948, Serial No. 27,094

5 Claims. (Cl. 259—1)

This invention relates to devices for accelerating the reaction between reacting material, and has for its object the provision of a novel device of this character. More particularly, the invention contemplates a device for producing high energy concentrations in liquids, gases and solid media undergoing reaction, and affecting thereby increased intensity of mixing, agitation, compression, vaporization and like operations which greatly accelerate the rate of the reaction.

The desirability of high energy mixing in a concentrated reaction zone is appreciated by those familiar with chemical and other allied technological processes and arts. The rate of reaction of a large number of chemical and other reactions are dependent to a great extent on the intensity of mixing, such for example as the degree of agitation applied. Some of these reactions include, among others, those of oxidation, hydrogenation, esterification, polymerization, hydrolysis, reduction, precipitation, saponification, emulsification, homogenization, dispersion, coagulation, vaporization, mechanical mixing, etc. In the interest of simplicity, the expression "reaction between reacting materials" throughout this specification and the appended claims is to be understood as including all such and similar reactions.

It has been recognized in the art that intensive mixing at a high energy input level would accelerate considerably the reaction rates involved in some of the aforementioned operations, thus enabling the reactions to be made continuous in operation, rather than batch. Greater uniformity of product would also ensue, due to better control in the reaction zone, by varying the intensity of the agitation, the temperature, rate of flow, concentration, and time in the reactor zone of the reacting materials.

The form of agitation usually employed in such cases is of a simple nature, such as a mechanically driven propeller, a shaker agitation device, or the like. Supersonic or ultrasound devices have been described in the literature for producing high energy concentrations in reaction zones, but the practical application of sound and ultrasound frequencies to industrial large scale, high power applications have been limited by several serious practical difficulties that have been encountered.

A piezo-electric transducer, such as a quartz crystal suitably cut and excited, can be made to produce high energy concentrations in the vicinity of the crystal. The limitations of such a device are due, amongst others, to their fragile nature, high cost, low power limitations (10 watts/sq. cm.), and electrical insulation problems.

Magneto-strictive devices for the same type of applications have also been described in the literature, and usually consist basically of a nickel or other rod or tube suitably cooled and placed in an alternating electro-magnetic field. The energy developed, due to the magneto-strictive effect, can be transferred either directly, or through a suitable liquid, gaseous, or solid transfer medium, to the desired zone of application. Such devices however are somewhat impracticable for large power transfer requirements, and inefficient, due to the relatively small areas available for the production of useful work.

It has been recognized as highly desirable that these drawbacks of the piezo-electric crystal, and/or magneto-striction device be overcome, so that the practical application of suitable electromechanical energy to commercial conditions be available. The device of the invention overcomes these drawbacks and meets the requirements of large scale commercial applications.

Certain materials have pronounced magnetostrictive properties, that is, the property of undergoing a change in dimension under the influence of a magnetic field. Some materials change dimension in a negative direction, that is, they shrink and can be said to have a negative magneto-strictive coefficient. Such materials include nickel, iron, annealed cobalt and their alloys. Materials that can increase in length under the influence of a magnetic field can be said to have a positive coefficient of magneto-striction. Included in this group are certain iron-aluminum alloys containing between about 5 and 17% aluminum, and cast cobalt.

For purposes of description only, two magnetostrictive metals will be employed as examples in the following description of the invention, namely, nickel (including copper and other alloys of high nickel content such as Monel metal), and iron-aluminum alloy with about 13.4% aluminum content. The former has a negative magnetostrictive coefficient, and the latter a positive magneto-strictive coefficient. Thus, we have two metallic materials that can be made to change dimension in opposing directions, in a magnetic field, independent of the sign of the field.

In a preferred embodiment of the invention, rigid geometric identical shapes are made from thin sheets of nickel and iron-aluminum alloy, in the form of skirted right cones. The nickel cones have a plurality of holes, arranged symmetrically on a radius with the apex, and near the base of the cone. The iron-aluminum cones have similarly a series of holes, situated close to the apex of the cone, on a radius with the apex, and lying in the plane of the sides of the cone shape. Alternately, the positions of the holes can be reversed. For example, the holes in the nickel cone can be close to the apex, and those in the iron-aluminum cone close to the base. Or again, instead of holes close to the apex, it is possible to eliminate or cut-off the top of the cone.

By nesting a plurality of such cones, so that alternate cones of positive and negative coefficients of magneto-striction are superimposed, and providing sufficient clearance between the cones, and by clamping and sealing off the skirts at their bases, it is possible to pass reacting materials through the stack by forcing them through, say from the inside of the lower cone, through the holes or orifices in the alternating cones, until the holes or orifices on the outer cone of the stack are reached. If reacting materials other than gases are to be passed through the stack, suitable clearances can be provided between the individual stack members by introducing spacing rings between adjacent cones.

Now, if this stack of cones is placed in an alternating magnetic field, so that the polarity of magnetization at any one instant is different in sign at the apex areas and the bases, or across the stack, the nickel cones will contract and the iron-aluminum cones will expand. Upon removal of the magnetic field the inherent elasticity of the materials of construction of the cones will cause the cones to resume their original shapes and relative positions, provided the elastic limits of the materials of construction have not been exceeded.

Thus, if a magnetic field of changing sign (i. e. an alternating magnetic field) is applied along the length of the cone stack, the alternate cones will vibrate in opposition to each other at a rate that will be a function of the applied frequency of alternation. Thus, any material that is forced through the stack system during such magnetic excitation will be subjected to these vibrations in a very effective manner.

The materials passing through the stack will be in relatively thin sheets on the surface, and will be subjected to large effective surface areas in a multiplicity of passes within the reactor zone. The intensity of agitation will be dependent, to a great extent, on the strength of the magnetic field acting on the stack, and is thereby capable of control.

The invention will be better understood from the following description taken in conjunction with the accompanying drawing, in which Fig. 1 diagrammatically illustrates, in sectional elevation, one form of the invention, Figs. 2 and 3 show, in elevation and plan respectively, one form of magneto-strictive cone, and Figs. 4 and 5 show, in elevation and plan respectively, another form of magneto-strictive cone.

Fig. 2 diagrammatically illustrates a conically shaped member 5 with an apex angle BAB' approximately 90°, and a skirted base 6 in a plane at an angle of 90° to the medial line AA' passing through the apex. A multiplicity of holes or orifices 7 are disposed circumferentially around the member 5 near its base.

Fig. 3 diagrammatically illustrates a similar conically shaped member 8 having a skirted base 9. The top of the member 8 is cut off, thus replacing the apex with a relatively large hole 10.

The conical members 5 and 8 constitute the two main elements of what is herein called a stack, that is, a multiplicity of cones closely stacked one upon another in such a fashion that the members 5 alternate with the members 8.

The conical members 5 and 8 are made of thin sheet metal, but the members 5 are made of a different metal than the members 8. Thus, the members 5 will be made of a metal having a negative magneto-strictive coefficient and the members 8 will be made of a metal having a positive magneto-strictive coefficient, or vice versa. Thus, when stacked, there is provided a stack of cones of similar shape, but with different orifice positions provided in adjacent cones, and with adjacent cones of different metallic composition. As previously stated, nickel is a preferred metal of negative magneto-strictive coefficient, and an iron-aluminum alloy containing 13.4% aluminum is the preferred metal of positive magneto-strictive coefficient. Other magneto-strictive metals are however available, as hereinbefore mentioned, and may be used.

Fig. 1 diagrammatically shows the stack assembly, within an electro-magnetic arrangement for providing an alternating magnetic field within the stack. The conical members 5 and 8 are stacked as previously described, and the stack is enclosed by a base 11 having an inlet pipe 12, and a cover 13 having an outlet pipe 14. Electro-magnetic coils 15 and 16 are positioned within the base 11 and around the cover 13, respectively, to provide an alternating magnetic field either across the stack section or along the stack length, as desired. A bottom plate 17 and a cap plate 18, each of magnetic material, enclose the coil system to concentrate the magnetic field. The electric conductor terminals 19 of the coil 15 are brought through suitable apertures in the cap plate 18, and the terminals 20 of the coil 16 are brought through apertures in the bottom plate 17. The assembly is conveniently clamped together by bolts 21 extending through registering holes in the skirts 6 and 9, in the base 11 and cover 13 and in the plates 17 and 18.

The direction of the magnetic field at any one instant, independent of sign, may be across the stack, along the length from base to apex, or alternating within the stack body. The frequency of alternation of the magnetic field can vary from 10 cycles up to 1 megacycle per second, depending on the physical characteristics of the stack, and the particular application involved. The alternating magnetic field may be of single or multiple phase, so that a rotating magnetic field may be applied to the stack if desired.

The method of operating the device of Fig. 3 will be understood from the foregoing description. The reacting materials (e. g. mixtures of liquids, mixtures of gases, mixtures of liquids and gases, etc.) are introduced into the stack through the inlet pipe 12, and the reaction product is withdrawn or evacuated through the outlet pipe 14. While undergoing treatment, the reacting materials pass through the stack in a zig-zag or tortuous path due to the positioning of the holes 7 and 10 in the alternate conical members 5 and 8, respectively. The alternating magnetic field applied to the stack vibrates the individual conical members 5 and 8 in opposition to one another, at a rate determined by the frequency of alternation of the magnetic field, and with an intensity determined by the strength of the magnetic field. The vibrations of the conical members 5 and 8 are transmitted to the reacting materials passing through the stack, thereby imparting any desired intensity of mixing, agitation or compression to the materials undergoing treatment. The smaller the clearance between the adjacent conical members 5 and 8 (and hence the shallower the stream of material flowing through the stack), the greater is the intensity of agitation and the intensity of compression.

The invention may be advantageously used in carrying out any of the chemical reactions hereinbefore mentioned, as well as in various other technological processes where intensive mixing, agitation, compression, vaporization or the like at a high energy input level is desired. The invention is not to be considered as limited to the form of device shown in the drawing, since the principles of the invention may be embodied in various other forms of apparatus.

I claim:

1. A device for accelerating the reaction between reacting materials which comprises a conically-shaped element of positive magneto-strictive coefficient in spaced relation with a similar conically-shaped element of negative magneto-strictive coefficient, one of said elements having an opening near its base and the other element having an opening near its apex, means associated with said elements for applying an alternating magnetic field thereto, and means for passing the reactive materials through the space between said elements and through said openings.

2. A device for accelerating the reaction between reacting materials which comprises a plurality of spaced elements of conical shape and having a positive magneto-strictive coefficient, a plurality of elements of conical shape and having a negative magneto-strictive coefficient positioned in the spaces between the first mentioned elements and spaced from each adjacent element, alternately positioned elements having openings near their bases and the other elements having openings near their apexes to provide a tortuous passage for the flow of the reacting materials through the spaces between adjacent elements, means associated with the assembly of all said elements for applying an alternating magnetic field thereto, and means for passing the reacting materials through the spaces between adjacent elements in the assembly.

3. A device for accelerating the reaction between reacting materials which comprises a plurality of conically-shaped elements assembled in spaced relation and having a positive magneto-strictive coefficient, a plurality of conically-shaped elements having a negative magneto-strictive coefficient and positioned in the spaces between the first mentioned elements and spaced from each adjacent element, each of said elements being rigidly held at the base thereof, means connecting the spaces between adjacent elements to provide a continuous tortuous passage therethrough for the flow of the reacting materials, and means associated with the assembly of all said elements for applying an alternating magnetic field thereto.

4. A device for accelerating the reaction between reacting materials which comprises a plurality of spaced elements of conical shape rigidly held at the base, alternately positioned elements having openings near the base and the other elements have openings near the apex to provide a tortuous passage for the flow of the reacting materials through the spaces between adjacent elements, said conical elements being comprised of materials capable of changing physical dimensions when subjected to the influence of a magnetic field, and means for applying a magnetic field to said elements.

5. A device according to claim 4 in which the conical elements are alternately comprised of materials that elongate and that contract under the influence of a magnetic field.

FRANCIS GEORGE FIRTH.

REFERENCES CITED

The following references are of record in the file of this patent:

UNITED STATES PATENTS

| Number | Name | Date |
|---|---|---|
| 436,514 | Wiegand | Sept. 16, 1890 |
| 1,882,399 | Pierce | Oct. 11, 1932 |
| 1,889,153 | Pierce | Nov. 29, 1932 |